(12) United States Patent
Aronson et al.

(10) Patent No.: US 8,769,171 B2
(45) Date of Patent: Jul. 1, 2014

(54) ELECTRICAL DEVICE WITH ELECTRICAL INTERFACE THAT IS COMPATIBLE WITH INTEGRATED OPTICAL CABLE RECEPTACLE

(75) Inventors: Lewis B. Aronson, Los Altos, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 726 days.

(21) Appl. No.: 12/098,343

(22) Filed: Apr. 4, 2008

(65) Prior Publication Data

US 2010/0325324 A1 Dec. 23, 2010

Related U.S. Application Data

(60) Provisional application No. 60/910,592, filed on Apr. 6, 2007.

(51) Int. Cl.
*G06F 13/12* (2006.01)
*G06F 13/38* (2006.01)
*G02B 6/42* (2006.01)
*H01R 13/66* (2006.01)
*H01R 13/717* (2006.01)
*H01R 31/06* (2006.01)

(52) U.S. Cl.
CPC ............ *G02B 6/4246* (2013.01); *H01R 31/065* (2013.01); *H01R 13/6658* (2013.01); *H01R 13/7172* (2013.01)
USPC .......................................................... 710/63

(58) Field of Classification Search
CPC ....................................................... G06F 13/387
USPC ............................................................ 710/63
See application file for complete search history.

(56) References Cited

U.S. PATENT DOCUMENTS

| 3,663,822 A | 5/1972 | Uchida |
| 3,792,284 A | 2/1974 | Kaelin |
| 4,127,862 A | 11/1978 | Ilegems et al. |

(Continued)

FOREIGN PATENT DOCUMENTS

| CN | 200780018055.3 | 3/2010 |
| CN | 200780018055.3 | 9/2010 |

(Continued)

OTHER PUBLICATIONS

Steve Joiner, Open Fiber Control for Parallel Optics, Communication Semiconductor Solutions Division, Mar. 27, 1997, 13, USA.

(Continued)

*Primary Examiner* — Idriss N Alrobaye
*Assistant Examiner* — Brooke Taylor
(74) *Attorney, Agent, or Firm* — Maschoff Brennan

(57) ABSTRACT

A device having a plug that is configured to mechanically interface with a receptacle external to the device. The plug also has an electrical interface that electrically interfaces with the receptacle even though the external receptacle has a mechanical and electrical interface shaped to interface with an integrated cable that includes an optical communication mechanism for communicating over most of the length of the integrated cable, and even though the device itself has a full electrical communication channel communicatively coupling a data communication endpoint of the device with the electrical interface of the plug.

20 Claims, 11 Drawing Sheets

(56) References Cited

U.S. PATENT DOCUMENTS

| | | |
|---|---|---|
| 4,427,879 A | 1/1984 | Becher et al. |
| 4,595,839 A | 6/1986 | Braun et al. |
| 4,768,188 A | 8/1988 | Barnhart et al. |
| 4,902,092 A | 2/1990 | Grandy |
| 5,064,299 A | 11/1991 | Hirschmann et al. |
| 5,166,761 A | 11/1992 | Olson et al. |
| 5,303,251 A | 4/1994 | Zelenka |
| 5,337,398 A | 8/1994 | Benzoni et al. |
| 5,341,086 A | 8/1994 | Fukudome |
| 5,448,661 A | 9/1995 | Takai et al. |
| 5,451,767 A | 9/1995 | Amano et al. |
| 5,497,187 A | 3/1996 | Banker et al. |
| 5,515,467 A | 5/1996 | Webb |
| 5,631,988 A | 5/1997 | Swirhun et al. |
| 5,668,419 A | 9/1997 | Oktay |
| 5,732,176 A | 3/1998 | Savage, Jr. |
| 5,892,784 A | 4/1999 | Tan et al. |
| 5,907,569 A | 5/1999 | Glance et al. |
| 5,926,303 A | 7/1999 | Giebel |
| 6,008,917 A | 12/1999 | Moise et al. |
| 6,036,654 A | 3/2000 | Quinn et al. |
| 6,115,516 A | 9/2000 | Watson et al. |
| 6,179,627 B1 | 1/2001 | Daly et al. |
| 6,217,231 B1 | 4/2001 | Mesaki et al. |
| 6,220,873 B1 | 4/2001 | Samela et al. |
| 6,267,606 B1 | 7/2001 | Poplawski et al. |
| 6,441,955 B1 | 8/2002 | Takatsu et al. |
| 6,446,867 B1 | 9/2002 | Sanchez |
| 6,458,619 B1 | 10/2002 | Irissou |
| 6,461,059 B2 | 10/2002 | Ando |
| 6,478,625 B2 | 11/2002 | Tolmie et al. |
| 6,502,997 B1 | 1/2003 | Lee et al. |
| 6,515,308 B1 | 2/2003 | Kneissi et al. |
| 6,539,147 B1 | 3/2003 | Mahony |
| 6,540,412 B2 | 4/2003 | Yonemura |
| 6,553,166 B1 | 4/2003 | Caldwell |
| 6,580,739 B1 | 6/2003 | Coldren |
| 6,588,942 B1 | 7/2003 | Weld |
| 6,607,307 B2 | 8/2003 | Gilliland et al. |
| 6,717,972 B2 | 4/2004 | Steinle et al. |
| 6,755,575 B2 | 6/2004 | Kronlund |
| 6,758,693 B2 | 7/2004 | Inagaki et al. |
| 6,774,348 B2 | 8/2004 | Tatum et al. |
| 6,793,539 B1 | 9/2004 | Lee et al. |
| 6,806,114 B1 | 10/2004 | Lo |
| 6,822,987 B2 | 11/2004 | Diaz et al. |
| 6,851,867 B2 | 2/2005 | Pang et al. |
| 6,905,257 B2 | 6/2005 | Eichenberger |
| 6,912,361 B2 | 6/2005 | Aronson et al. |
| 6,914,637 B1 | 7/2005 | Wolf et al. |
| 6,920,161 B2 | 7/2005 | Riaziat et al. |
| 6,941,395 B1 | 9/2005 | Galang et al. |
| 6,952,395 B1 | 10/2005 | Manoharan et al. |
| 6,954,592 B2 | 10/2005 | Tan et al. |
| 6,965,722 B1 | 11/2005 | Nguyen |
| 7,062,171 B2 | 6/2006 | Ota et al. |
| 7,065,604 B2 | 6/2006 | Konda et al. |
| 7,070,425 B2 | 7/2006 | Regen et al. |
| 7,088,518 B2 | 8/2006 | Tatum et al. |
| 7,153,039 B2 | 12/2006 | McGarvey et al. |
| 7,154,921 B2 | 12/2006 | Kitamura et al. |
| 7,162,130 B2 | 1/2007 | Castellani et al. |
| 7,170,097 B2 | 1/2007 | Edmond et al. |
| 7,179,329 B2 | 2/2007 | Boone et al. |
| 7,217,022 B2 | 5/2007 | Ruffin |
| 7,269,194 B2 | 9/2007 | Diaz et al. |
| 7,269,673 B2 | 9/2007 | Kim et al. |
| 7,277,620 B2 | 10/2007 | Vongseng et al. |
| 7,294,868 B2 | 11/2007 | Debray et al. |
| 7,327,959 B2 * | 2/2008 | Pelletier et al. ............... 398/139 |
| 7,371,014 B2 | 5/2008 | Willis et al. |
| 7,373,069 B2 | 5/2008 | Lazo |
| 7,401,985 B2 | 7/2008 | Aronson et al. |
| 7,445,389 B2 | 11/2008 | Aronson |
| 7,496,161 B2 | 2/2009 | Chou et al. |
| 7,499,616 B2 | 3/2009 | Aronson et al. |
| 7,548,675 B2 | 6/2009 | Tatum et al. |
| 7,729,618 B2 | 6/2010 | Tatum et al. |
| 2001/0035994 A1 | 11/2001 | Agazzi et al. |
| 2002/0006251 A1 | 1/2002 | Kim et al. |
| 2002/0018609 A1 | 2/2002 | Schumann |
| 2002/0044746 A1 | 4/2002 | Kronlund et al. |
| 2002/0049879 A1 | 4/2002 | Eyer |
| 2002/0063935 A1 | 5/2002 | Price et al. |
| 2002/0076157 A1 | 6/2002 | Kropp |
| 2002/0101898 A1 | 8/2002 | Lo et al. |
| 2002/0114590 A1 | 8/2002 | Eichenberger et al. |
| 2002/0126967 A1 * | 9/2002 | Panak et al. .................... 385/101 |
| 2002/0136510 A1 | 9/2002 | Heinz et al. |
| 2002/0149821 A1 | 10/2002 | Aronson et al. |
| 2002/0159725 A1 | 10/2002 | Bucklen |
| 2002/0160656 A1 | 10/2002 | Nishita |
| 2002/0177362 A1 | 11/2002 | Chang |
| 2002/0186243 A1 | 12/2002 | Ellis et al. |
| 2003/0016920 A1 | 1/2003 | Sohmura et al. |
| 2003/0021580 A1 | 1/2003 | Matthews |
| 2003/0034963 A1 | 2/2003 | Moon et al. |
| 2003/0117960 A1 | 6/2003 | Quinlan et al. |
| 2003/0129865 A1 * | 7/2003 | Kato et al. ............... 439/79 |
| 2003/0145258 A1 | 7/2003 | Warner et al. |
| 2003/0198445 A1 * | 10/2003 | Inujima et al. ................ 385/92 |
| 2003/0208779 A1 | 11/2003 | Green et al. |
| 2003/0214807 A1 | 11/2003 | Liu |
| 2003/0223756 A1 | 12/2003 | Tatum et al. |
| 2004/0008996 A1 | 1/2004 | Aronson et al. |
| 2004/0076119 A1 | 4/2004 | Aronson et al. |
| 2004/0141695 A1 | 7/2004 | Miller et al. |
| 2004/0158873 A1 | 8/2004 | Pasqualino |
| 2004/0184746 A1 | 9/2004 | Chang et al. |
| 2004/0208207 A1 | 10/2004 | Kasper et al. |
| 2004/0208600 A1 | 10/2004 | Guenter et al. |
| 2004/0252560 A1 | 12/2004 | Hsieh |
| 2004/0263941 A1 | 12/2004 | Chen et al. |
| 2004/0264879 A1 | 12/2004 | McColloch et al. |
| 2005/0036746 A1 | 2/2005 | Scheibenreif et al. |
| 2005/0053340 A1 | 3/2005 | Toriumi et al. |
| 2005/0063440 A1 | 3/2005 | Deppe |
| 2005/0063707 A1 | 3/2005 | Imai |
| 2005/0063711 A1 | 3/2005 | Rossi et al. |
| 2005/0078916 A1 | 4/2005 | Hosking |
| 2005/0105910 A1 | 5/2005 | Light |
| 2005/0105913 A1 | 5/2005 | Ozeki et al. |
| 2005/0105915 A1 | 5/2005 | Light |
| 2005/0180700 A1 | 8/2005 | Farr |
| 2005/0232555 A1 * | 10/2005 | Rosenberg ................ 385/88 |
| 2005/0238358 A1 | 10/2005 | Light |
| 2005/0249477 A1 | 11/2005 | Parrish |
| 2005/0286593 A1 | 12/2005 | Guenter |
| 2006/0008276 A1 | 1/2006 | Sakai et al. |
| 2006/0025018 A1 * | 2/2006 | Dube et al. ................ 439/628 |
| 2006/0026348 A1 * | 2/2006 | Wallace et al. ............... 711/115 |
| 2006/0036788 A1 | 2/2006 | Galang et al. |
| 2006/0045425 A1 | 3/2006 | Kanie et al. |
| 2006/0045437 A1 | 3/2006 | Tatum et al. |
| 2006/0045526 A1 | 3/2006 | Katayama et al. |
| 2006/0049936 A1 | 3/2006 | Collins et al. |
| 2006/0067690 A1 | 3/2006 | Tatum et al. |
| 2006/0077778 A1 | 4/2006 | Tatum et al. |
| 2006/0083518 A1 | 4/2006 | Lee et al. |
| 2006/0088251 A1 * | 4/2006 | Wang et al. ................ 385/88 |
| 2006/0093280 A1 | 5/2006 | McColloch et al. |
| 2006/0142744 A1 | 6/2006 | Boutoussov |
| 2006/0147214 A1 * | 7/2006 | Ruiz et al. ................ 398/135 |
| 2006/0164115 A1 * | 7/2006 | Komiya et al. ................ 324/765 |
| 2006/0203830 A1 | 9/2006 | Doi |
| 2006/0222300 A1 | 10/2006 | Frenzel et al. |
| 2007/0058976 A1 | 3/2007 | Tatum et al. |
| 2007/0122086 A1 * | 5/2007 | Lin ................ 385/88 |
| 2007/0143509 A1 * | 6/2007 | Ni et al. ................ 710/100 |
| 2007/0224884 A1 | 9/2007 | Engel et al. |
| 2007/0233906 A1 | 10/2007 | Tatum et al. |
| 2007/0291938 A1 * | 12/2007 | Rao et al. ................ 380/210 |
| 2008/0013896 A1 * | 1/2008 | Salzberg et al. ................ 385/89 |
| 2008/0044140 A1 * | 2/2008 | Wang et al. ................ 385/88 |

(56) References Cited

U.S. PATENT DOCUMENTS

FOREIGN PATENT DOCUMENTS

| | | |
|---|---|---|
| GB | 0820337.4 | 2/2009 |
| JP | 07-210644 | 8/1995 |
| JP | 08-008818 | 1/1996 |
| JP | 08130508 | 5/1996 |
| JP | 09-162811 | 6/1997 |
| JP | 2000241642 | 9/2000 |
| JP | 2002208896 | 7/2002 |
| JP | 2002-366340 | 12/2002 |
| JP | 2003-163639 | 6/2003 |
| JP | WO03063309 | 7/2003 |
| JP | 2003249711 | 9/2003 |
| JP | 2003-332667 | 11/2003 |
| JP | WO2004054139 | 6/2004 |
| JP | 2004200847 | 7/2004 |
| JP | 2004213949 | 7/2004 |
| JP | 2004241361 | 8/2004 |
| WO | 2004054139 | 6/2004 |
| WO | PCT/US2006/034110 | 7/2007 |
| WO | PCT/US2007/066655 | 2/2008 |
| WO | PCT/US2006/036093 | 3/2008 |
| WO | PCT/US2007/78658 | 3/2008 |
| WO | PCT/US2008/059579 | 8/2008 |

OTHER PUBLICATIONS

U.S. Appl. No. 10/829,609, filed Apr. 22, 2004 entitled "Compact Optical Transceivers."
"IEC 825-1 Eye Safety Classifcation of Some Consumer Electronic products," A.C. Boucouvalas, Bournemouth University, School of Electronics, Talbot campus, Fern Barrow, Pole, Dorset, BH12 5BB, U.K. E-mail: tbournemouth.ac.uk, 1996 The Institution of Electrical Engineers, printed and published by the IEE, Savoy Place, London WC2R OBL, UK, (Web page; 6 pages).
U.S. Appl. No. 11/009,208, Oct. 26, 2007, Notice of Allowance.
U.S. Appl. No. 11/009,208, Oct. 1, 2007, Office Action.
U.S. Appl. No. 11/009,208, Apr. 3, 2007, Final Office Action.
U.S. Appl. No. 11/009,208, Jul. 26, 2006, Office Action.
U.S. Appl. No. 11/009,208, Feb. 14, 2006, Office Action.
U.S. Appl. No. 11/198,619, Dec. 17, 2008, Office Action.
U.S. Appl. No. 11/198,619, Apr. 18, 2008, Final Office Action.
U.S. Appl. No. 11/198,619, Nov. 16, 2007, Office Action.
U.S. Appl. No. 11/198,619, May 4, 2007, Final Office Action.
U.S. Appl. No. 11/198,619, Oct. 11, 2006, Office Action.
U.S. Appl. No. 11/468,280, Oct. 20, 2008, Office Action.
U.S. Appl. No. 11/468,280, Jul. 28, 2008, Office Action.
U.S. Appl. No. 11/468,280, Mar. 20, 2008, Final Office Action.
U.S. Appl. No. 11/468,280, Sep. 11, 2007, Office Action.
U.S. Appl. No. 11/402,106, Oct. 20, 2008, Notice of Allowance.
U.S. Appl. No. 11/402,106, Apr. 29, 2008, Office Action.
U.S. Appl. No. 11/402,106, Dec. 28, 2007, Final Office Action.
U.S. Appl. No. 11/402,106, May 7, 2007, Final Office Action.
U.S. Appl. No. 11/402,106, Sep. 21, 2006, Office Action.
U.S. Appl. No. 11/402,186, Jul. 3, 2007, Final Office Action.
U.S. Appl. No. 11/402,186, Oct. 10, 2006, Office Action.
U.S. Appl. No. 11/198,606, Jul. 9, 2008, Final Office Action.
U.S. Appl. No. 11/198,606, Dec. 31, 2007, Office Action.
U.S. Appl. No. 11/470,623, Sep. 9, 2008, Final Office Action.
U.S. Appl. No. 11/470,623, Feb. 19, 2008, Office Action.
U.S. Appl. No. 11/401,803, Jun. 30, 2008, Notice of Allowance.
U.S. Appl. No. 11/401,803, Aug. 24, 2007, Office Action.
U.S. Appl. No. 11/401,803, Jul. 11, 2007, Office Action.
U.S. Appl. No. 11/401,802, Mar. 20, 2008, Final Office Action.
U.S. Appl. No. 11/401,802, Apr. 17, 2007, Office Action.
U.S. Appl. No. 11/402,241, Mar. 25, 2008, Office Action.
U.S. Appl. No. 11/402,241, Apr. 17, 2007, Office Action.
U.S. Appl. No. 11/402,169, Feb. 21, 2008, Final Office Action.
U.S. Appl. No. 11/402,169, Jun. 29, 2007, Office Action.
U.S. Appl. No. 11/402,161, Mar. 14, 2008, Notice of Allowance.
U.S. Appl. No. 11/402,161, Sep. 11, 2007, Office Action.
U.S. Appl. No. 11/402,161, May 31, 2007, Office Action.
"Fiber Optic Infrastructure," © 2000 by Extreme Networks, Inc.
"Optical DVI—HDCP Extension Cable," by Opticis, dated Aug. 27, 2003.
Caruso, Jeff; "Bandwidth Boom: Making the Connection, Can Fiber Break Through the Glass Ceiling?" Jul. 13, 1998 [retrieved on Apr. 25, 2005]. (Web page; 3 pages). http://www.internetweek.com/supp/bandwidth/canfiber.htm.
Opticis; "Optical DV1 Extension Module" © 2005 [retrieved on Apr. 25, 2005]. (Web page; 2 pages). http://www.opticis.com/products_2.htm.
Kanellos, Michael; "Intel Gets Optical With Fibre" Mar. 1, 2004 [retrieved on Apr. 26, 2005]. (Web page; 2 pages). http://news.zdnet.co.uk/0,39020330,39147918,00.htm.
Kanellos, Michael; "Intel Connects Chips With Optical Fiber" Feb. 27, 2004 [retrieved on Apr. 26, 2005]. (Web page; 5 pages). http://news.zdnet.com/2100-9574_22-5166883.html.
"Sandia Develops Vertical Cavity Surface Emitting Laser that Promises to Reduce Cost of Fiber Optics Connections," Sandia National Laboratories, Jun. 6, 2000, (Web page; 3 pages). http://www.sandia.gove/media/NewsRel/NR2000/laser.htm.
Digital Visual Interface DVI Revision 1.0, Digital Display Working Group. Apr. 2, 1999.
High-Definition Multimedia Interface Specification Version 1.1, HDMI Licensing, LLC. May 20, 2004.
High-Definition Multimedia Interface Specification Version 1.1, HDMI Licensing, LLC. Aug. 22, 2005.
"Full-Scale Entry of Optical Transmission System Business Begins as Fujifilm Introduces Optical DVI Link System That Utilizes Lumistar, A Graded Index Plastic Optical Fiber—Realizes World's First 30M-Class High-speed Optical Linking of Digital Images Using a Plastic Optical Fiber"; Sep. 8, 2004, (Web Page; 3 pages). http://www.fujifilm.com/news/n040908.html (3 pages).
"Optical DVI (Digital Visual Interface) Link System" (Picture Image, 1 page). First date of publication unknown.
"DVI Extender Extend a single link digital DVI display up to 4,950 feet (1,500 meters). Also known as: DVI Optical Extension, DVI-D extender, DVI digital to multimode fiber, optical extender, graphic extension modules, fiber optic digital video extender"; (Web Page; 2 pages). Date of first publication unknown. http://www.networktechinc.com/dvi-optical-extender.html.
"DVI and HDMI extension, CAT5 and Fiber Optic Perfect Extenders for your Projector, Plasma, LCD screen or HDTV"; (Web Page; 6 pages). Date of first publication unknown. http://www.ramelectronics.net/html/DVI_fiber_cables.html.
Inova Semiconductors, Application Note, GigaStar Digital Display Link, Interfacing Between GigaSTaR DDL and DVI/LVDS, Revision 1.0, 10 pages.
U.S. Appl. No. 11/402,106, filed Apr. 10, 2006; Active Optical Cable With Electrical Connector; Lewis B. Aronson et al.
U.S. Appl. No. 11/402,186, filed Apr. 10, 2006; Active Optical Cable Electrical Connector; Lewis B. Aronson et al.
U.S. Appl. No. 11/402,241, filed Apr. 10, 2006; Active Optical Cable Electrical Adaptor; Lewis B. Aronson et al.
U.S. Appl. No. 11/402,161, filed Apr. 10, 2006 Electrical-Optical Active Optical Cable; Lewis B. Aronson et al.
U.S. Appl. No. 11/401,802, filed Apr. 10, 2006; Active Optical Cable With Integrated Power; Lewis B. Aronson et al.
U.S. Appl. No. 11/402,169, filed Apr. 10, 2006; Active Optical Cable With Integrated Retiming; Lewis B. Aronson et al.
U.S. Appl. No. 11/401,803, filed Apr. 10, 2006; Active Optical Cable With Integrated Eye Safety; Lewis B. Aronson.
U.S. Appl. No. 11/468,280, filed Aug. 28, 2006; Optical Networks for Consumer Electronics; Jimmy A. Tatum et al.
U.S. Appl. No. 11/470,623, filed Sep. 6, 2006; Laser Drivers for Closed Path Optical Cables; Jim A. Tatum et al.
Opticis, M1-1PO DVI—HDCP Extension Cable, Stretch your Digital Visual Interface Experience, Version 1.03 Aug. 2003, www.opticis.com, 2 pages.
Fiedler et al., "A 1.0625 Gbps Transceiver with 2x-Oversampling and Transmit Signal Pre-Emphasis," ISSCC97/Session 15/ Serial Data Communication/ Paper FP 15.1.
U.S. Appl. No. 11/468,280, Jan. 12, 2010, Notice of Allowance.

(56) References Cited

OTHER PUBLICATIONS

U.S. Appl. No. 11/468,280, Jun. 3, 2009, Office Action.
U.S. Appl. No. 11/402,186, Apr. 5, 2010, Notice of Allowance.
U.S. Appl. No. 11/402,186, Aug. 13, 2009, Office Action.
U.S. Appl. No. 11/198,606, Dec. 7, 2009, Notice of Allowance.
U.S. Appl. No. 11/198,606, Nov. 23, 2009, Office Action.
U.S. Appl. No. 11/198,606, Feb. 24, 2009, Office Action.
U.S. Appl. No. 11/470,623, Apr. 26, 2010, Notice of Allowance.
U.S. Appl. No. 11/470,623, Jan. 11, 2010, Notice of Allowance.
U.S. Appl. No. 11/470,623, Apr. 17, 2009, Office Action.
U.S. Appl. No. 11/401,803, Apr. 3, 2008, Notice of Allowance.
U.S. Appl. No. 11/401,802, May 20, 2010, Notice of Allowance.
U.S. Appl. No. 11/401,802, Nov. 30, 2009, Office Action.
U.S. Appl. No. 11/401,802, Feb. 3, 2009, Office Action.
U.S. Appl. No. 11/401,802, Jul. 30, 2008, Panel Decision.
U.S. Appl. No. 11/401,802, Nov. 1, 2007, Restriction Requirement.
U.S. Appl. No. 11/402,241, Dec. 29, 2009, Office Action.
U.S. Appl. No. 11/402,241, Nov. 1, 2007, Restriction Requirement.
U.S. Appl. No. 11/402,241, May 29, 2009, Final Office Action.
U.S. Appl. No. 11/402,241, Jul. 9, 2010, Final Office Action.
U.S. Appl. No. 11/402,169, Apr. 1, 2010, Notice of Allowance.
U.S. Appl. No. 11/402,169, Feb. 16, 2010, Notice of Allowance.
U.S. Appl. No. 11/402,169, Dec. 23, 2009, Notice of Allowance.
U.S. Appl. No. 11/402,169, Feb. 10, 2009, Office Action.
U.S. Appl. No. 11/198,619, Apr. 13, 2009, Notice of Allowance.
U.S. Appl. No. 12/262,872, Nov. 30, 2009, Office Action.
U.S. Appl. No. 12/262,872, Mar. 29, 2010, Notice of Allowance.
U.S. Appl. No. 12/262,872, Aug. 24, 2009, Interview Summary.
U.S. Appl. No. 12/262,872, Jun. 15, 2009, Restriction Requirement.
U.S. Appl. No. 11/470,623, Aug. 19, 2010, Notice of Allowance.

* cited by examiner

ELECTRICAL DEVICE WITH ELECTRICAL INTERFACE THAT IS COMPATIBLE WITH INTEGRATED OPTICAL CABLE RECEPTACLE

CROSS-REFERENCE TO RELATED APPLICATIONS

This application claims the benefit of U.S. provisional patent application Ser. No. 60/910,592 filed Apr. 6, 2007, which provisional patent application is incorporated herein by reference in its entirety.

BACKGROUND

Communication technology has transformed our world. As the amount of information communicated over networks has increased, high speed transmission has become ever more critical. High speed communications often rely on the presence of high bandwidth capacity links between network nodes. There are both copper-based solutions and optical solutions used when setting up a high bandwidth capacity link. A link may typically comprise a transmitter that transmits a signal over a medium to a receiver, either in one direction between two network nodes, or bi-directionally. An optical link might include, for example, an optical transmitter, a fiber optic medium, and an optical receiver for each direction of communication. In duplex mode, an optical transceiver serves as both an optical transmitter that serves to transmit optically over one fiber to the other node, while receiving optical signals over another fiber (typically in the same fiber-optic cable).

Presently, communication at more than 1 gigabit per second (also commonly referred to as "1G") links are quite common. Standards for communicating at 1G are well established. For instance, the Gigabit Ethernet standard has been available for some time, and specifies standards for communicating using Ethernet technology at the high rate of 1G. At 1G, optical links tend to be used more for longer spanning links (e.g., greater than 100 meters), whereas copper solutions tend to be used more for shorter links due in large part to the promulgation of the 1000Base-T standard, which permits 1G communication over standard Category 5 ("Cat-5") unshielded twisted-pair network cable for links up to 100 meters.

More recently, high-capacity links at 10 gigabits per second (often referred to in the industry as "10G") have been standardized. As bandwidth requirements increase, potential solutions become more difficult to accomplish, especially with copper-based solutions. One copper-based 10G solution is known as 10GBASE-CX4 (see IEEE Std 802.3ak-2004, "Amendment: Physical Layer and Management Parameters for 10 Gb/s Operation Type 10GBASE-CX4" Mar. 1, 2004), which accomplishes the higher bandwidth, despite the use of copper. 10GBASE-CX4 uses a cable, which includes 4 shielded different pairs carrying a quarter of the bandwidth in each direction, for a total of 8 differential copper pairs. This cable is quite bulky (typically about 0.4" or 10 mm in diameter) and expensive to make and cannot be terminated in the field (as can CAT-5 for example). Furthermore, this copper-based 10G solution is limited to distances of about 15 m without special efforts. Alternative copper-based 10G solutions are being developed and standardized but are likely also to require significant power consumption.

The primary example is known as 10GBASE-T under development in the IEEE (see IEEE draft standard 802.3an, "Part 3: Carrier Sense Multiple Access with Collision Detection (CSMA/CD) Access Method and Physical Layer Specifications Amendment: Physical Layer and Management Parameters for 10 Gb/s Operation, Type 10GBASE-T" 2006). This standard uses CAT5e or CAT6A unshielded twisted pair cable for distances to 55 m and 100 m respectively. However it is expected that because of the extremely complex signal processing required, this standard will require circuitry with very high power dissipation, initially as high as 8-15 Watts (per port and thus twice this per link). A lower power variant which only achieves 30 m on CAT6A cable is still expected to be more than 4 Watts per port. These high power levels represent both a significant increase in operating costs and perhaps more importantly, limitations on the density of ports which can be provided on a front panel. For example, power dissipations of 8-15 W could limit port density to 8 ports or less in the space of a typical 1U rack unit, whereas 1000BASE-T and 1G optical interfaces such as the SFP transceiver can provide up to 48 ports in the same space. Nevertheless, because of the cost of present day optical solutions at 10G, there remains interest in this copper solution.

At the present stage, those setting up the high-bandwidth link will often weigh the pros and cons of using a copper-based solution versus an optical solution. Depending on the results of that decision, the systems will be set up with an electrical port if they decided to proceed with a copper-based solution, or an optical port (often more specifically a cage and connector to receiver a standard mechanical form factor optical transceiver such as the SFP) if they decided to proceed with an optical solution.

BRIEF SUMMARY

Although not required, embodiments of the present invention relate to a device that includes a plug that is configured to mechanically interface with a special receptacle external to the device. The external receptacle has a mechanical and electrical interface shaped to interface with an integrated cable that includes an optical communication mechanism for communicating over much of the length of the integrated cable. However, the device is not such an integrated cable. That is to say, the device does not use an optical communication mechanism for communicating data. Even so, the plug of the device has an electrical interface configured to electrically interface with the receptacle even though the device itself has a full electrical communication channel communicatively coupling a data communication endpoint of the device with the electrical interface of the plug.

This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION OF THE PREFERRED EMBODIMENTS

Embodiments of the present invention relate to a device that includes a plug that is configured to mechanically interface with a special receptacle external to the device. The external receptacle has a mechanical and electrical interface shaped to interface with an integrated cable that includes an optical communication mechanism for communicating over much of the length of the integrated cable. However, the device is not such an integrated cable. Even so, the plug of the device has an electrical interface configured to electrically interface with the receptacle even though the device itself has a full electrical communication channel communicatively coupling a data communication endpoint of the device with the electrical interface of the plug.

Before describing this device in further detail, the characteristics of an example integrated cable will be described in some detail. While not all of the embodiments of such an integrated cable will be described herein, one such embodiment will be described with respect to FIGS. 1 through 4. Then, the principles of the present invention will be more specifically described with respect to FIGS. 5A through 11.

The integrated cable is exposed at least at one end using an electrical connection, while communicating over much of its length using optical fiber. Thus, those designing or selecting networking equipment or administrating network nodes need not choose a copper-based solution or an optical solution in communicating over a network. Instead, the network node need only have an electrical port of some type to thereby support either copper-based communication or optical communication. In addition to network applications, such a cable can support point to point high speed serial connections such as the transmission of serialized video data from source to a display. The communication over the optical fiber may be high speed and suitable for 10G applications and higher. As will described below, cable designs which are purely electrical but mechanically and electrically interoperate with the optical cables described herein may be included as part of a complete system to provide the most effective solutions over the widest range of applications.

Figure 1:
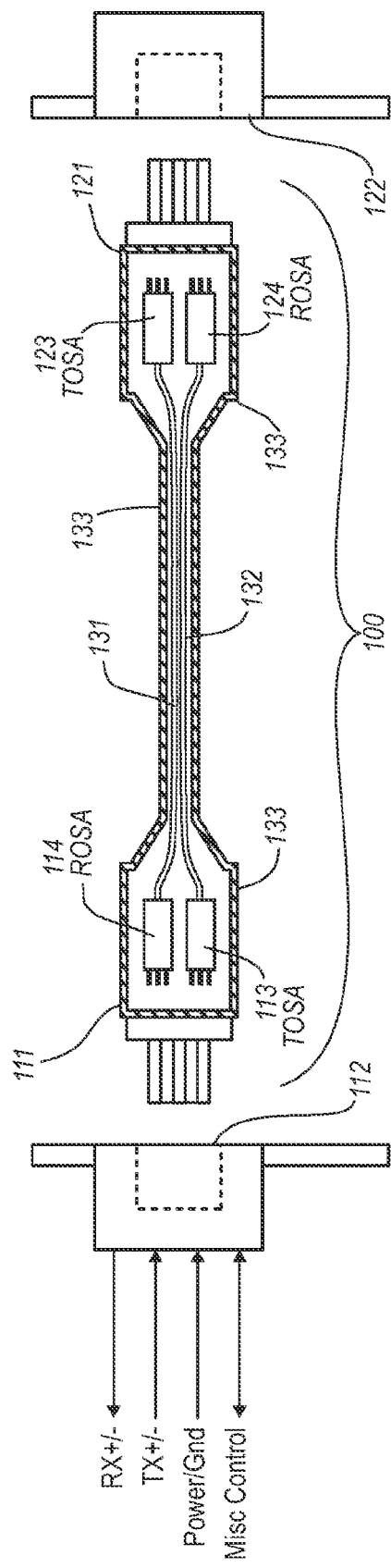
FIG. 1 illustrates a fully duplex electrical-to-electrical cable.

FIG. 1 schematically illustrates an integrated cable 100 that has electrical connections 111 and 121 at both ends. Each electrical connection is sized and configured to connect to a corresponding electrical port at each network node. For example, electrical connector 111 is configured to connect to electrical port 112 at one network node, while the electrical connector 121 is configured to connect to the electrical port 122 at the other network node. From the external connection viewpoint, it is as though the cable is entirely an electrical cable.

However, upon closer examination of the cable 100 of FIG. 1, communication over at least part of the cable length is actually accomplished via optical fibers. Each end of the cable 100 has optics that support duplex-mode optical communications. Specifically, the optics at each end of the cable 100 include a transmit optical sub-assembly (TOSA) for transmission of an optical signal over one optical fiber and a receive optical sub-assembly (ROSA) for receipt of an optical signal from another optical fiber. Integrated circuits to drive the transmitting optics and to receive the detected signal are included. These ICs may be outside the TOSA or ROSA or may be integrated directly in their design. Though the cable 100 is illustrated as supporting duplex-mode in which optical communication occurs in either direction, the cable may also perform communication in one direction consisting of a single transmitter at one end and a single receiver at the other.

Referring in further detail to FIG. 1, the cable 100 includes two optical fibers 131 and 132 integrated within the cable 100. When an electrical signal is applied to the appropriate connections of the electrical connector 121 (e.g., through the electrical port 122), those electrical signals are converted by a laser driver and TOSA 123 (or more specifically by an electro-optical transducer within the TOSA 123) to a corresponding optical signal. As noted, the laser driver may be included within the TOSA. The optical signal is transmitted over optical fiber 131 to ROSA 114. The ROSA 114 (or more specifically, an opto-electronic transducer within the ROSA 114) converts the optical signal received from the optical fiber 131 into a corresponding electrical signal. Typically the optical transducer would consist of a PIN detector and a preamplifier Integrated Circuit (IC), usually with a transimpedance amplifier front-end design. A limiting amplifier may also be integrated with the preamplifier or provided separately. The electrical signal is applied on the appropriate connections of the electrical connector 111, whereupon it is provided to the electrical port 112. While the cable 100 may be of any length, in one embodiment, the length is from 1 to 100 meters. The cable may support high speed communication range between 1 to 10 gigabits per second and beyond.

In bi-directional communication, when an electrical signal is applied to the appropriate connections of the electrical connector 111 (e.g., through the electrical port 112), those electrical signals are converted by a laser driver and TOSA 113 (or more specifically by an electro-optical transducer within the TOSA 113) to a corresponding optical signal. Once again, the laser driver may (but need not) be integrated within the TOSA. The optical signal is transmitted over optical fiber 132 to ROSA 124. The ROSA 124 (or more specifically, an opto-electronic transducer within the ROSA 124) converts the optical signal received from the optical fiber 132 into a corresponding electrical signal. The electrical signal is applied on the appropriate connections of the electrical connector 121, whereupon it is provided to the electrical port 122. The cable 100 may additionally include a protective coating 133 which protects the optical fibers, the optics and portions of the electrical connectors. Finally, though not shown in the figure, the fiber optic cable might include some form of strength member such as Kevlar yarn.

Of course, the opto-electronic conversion process and the electro-optic conversion process require power in order to convert between optical and electrical energy. Thus, the electrical connectors supply power from the host at least one end of the cable 133 to power the opto-electronic conversion. The power connection may be, for example, a 3.3 volt power connection. In FIG. 1, for example, the electrical port 112 is illustrated as supplying Power/Gnd connections for conveying electrical power from the host to electrical connector 111.

Thus, conveyance of information is accomplished largely by means of an optical signal, while providing electrical connections on both ends of the cable. The purchaser of the cable need not even be aware that the cable is an optical cable. In fact, a copper cable could be provided for particularly short links (perhaps 1 to 5 meters) which emulates the cable 100 of FIG. 1.

Thus, the user need not be concerned about choosing whether copper-based solutions or optical solutions are more appropriate, and then choose to configure the system with the appropriate ports. Instead, the user may just plug in the cable, and enjoy all of the benefits of optical communication such as, for example, high bandwidth communication with low power consumption and high port density, and with less pre-processing and post-processing of information. Alternatively, the user could choose a copper based version of the cable for particularly short links (say from the top to the bottom of a rack of switching equipment) if economically advantageous.

Finally, there are a number of characteristics of the electrical connector system which would be favorable for such an application. First, there might be a latching mechanism such as the tab style latch found in an RJ-45 style connector or a push-pull style latch employed in the SC style fiber optic connector.

Second, the receptacle on the host system may include provisions for visual indicators of link activity and other status. This may be accomplished by two means common in the RJ-45 connector system. The first is inclusion of LEDs in the front panel face of the host receptacle with electrical connections to the host PCB. A second method is to include plastic light pipes within the receptacle assembly to guide light from LEDs on the host PCBA to the front surface of the receptacle.

Third, the cable may have a provision for some sort of keying system to allow or prevent different types of host systems from being interconnected. One example where a keying system would be important is to prevent the insertion of a single link cable in a dual link port. Another example would be the prevention of the connection of two host systems running different protocols, though this could be detected by protocol means themselves. For example, exactly the same cable may be useful for Ethernet and Fiber Channel applications, yet a system's administrator running a datacenter with both types of equipment may wish to prevent the interconnection of these systems by simple mechanical means. Of course color coding or other simple means could be used for this purpose as well. Keying features on a connector often comprise a mechanical protrusion on one of a set of locations on the host receptacle and corresponding slots on the cable plug, or vice versa. Examples of these features can be found in the definition of the HSSDC2 connector (see Small Form Factor Committee document SFF-8421 rev 2.6, Oct. 17, 2005).

Figure 2A:
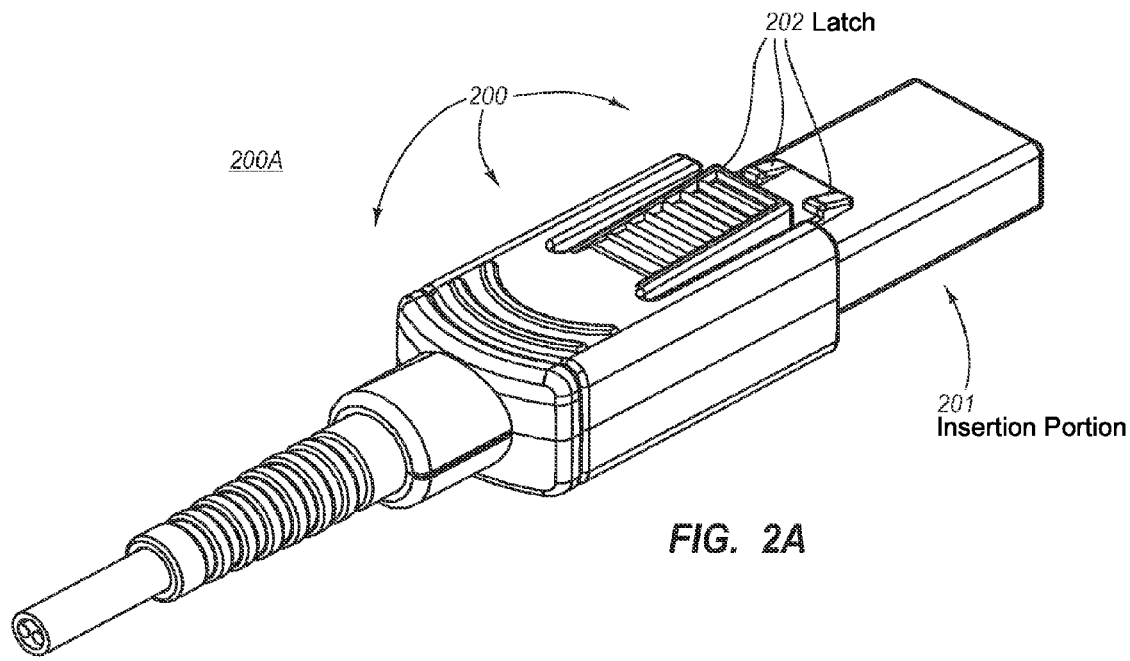
FIG. 2A illustrates a top rear perspective view of an electrical connector representing one embodiment of a connector that may be used in FIG. 1
Figure 2B:
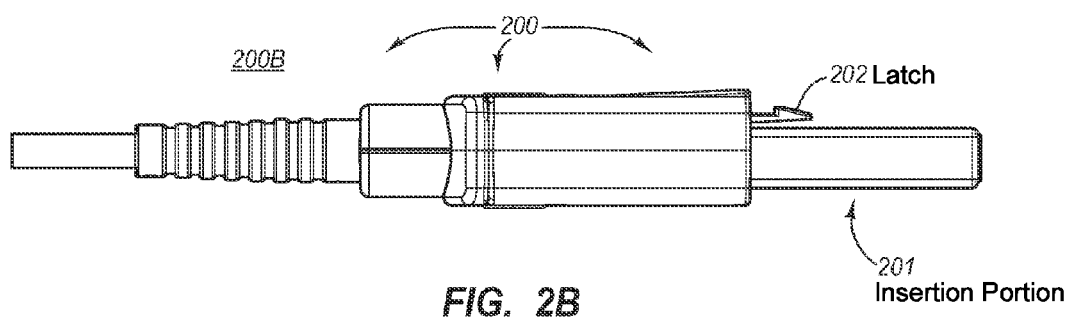
FIG. 2B illustrates a side view of the electrical connector of FIG. 2A.
Figure 2C:
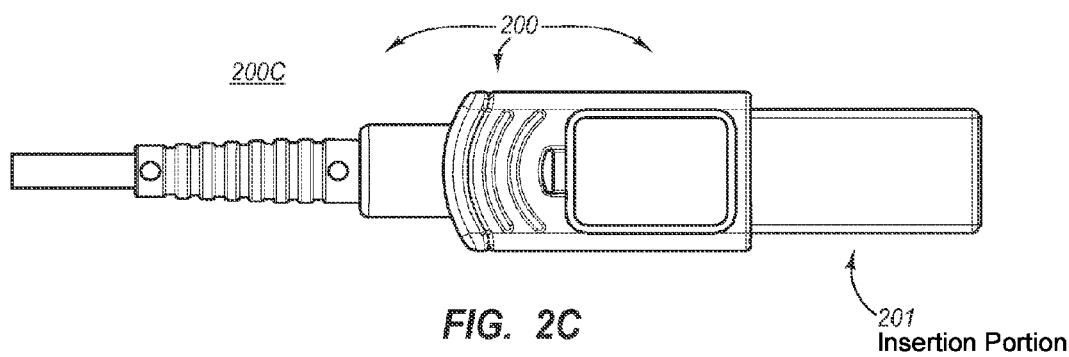
FIG. 2C illustrates a bottom view of the electrical connector of FIG. 2A.

FIGS. 2A, 2B and 2C illustrate a respective top rear perspective view 200A, side view 200B, and bottom view 200C of an electrical connector 200 representing one embodiment of the electrical connectors 111 or 121 described above with respect to FIG. 1. FIGS. 2A through 2C are present to show how the connector might mechanically interface with a receptacle. The connector 200 includes an insertion portion 201 that may be inserted into the receptacle, whereupon a latch 202 may mechanically engage with the receptacle to lock the connector 200 into place within the receptacle until the next time the latch 202 is disengaged. The latch 202 engages with the receptacle by simply pushing the insertion portion 201 into the receptacle, causing the latch 202 to depress downwards as the latch 202 engages the receptacle. The structure of the receptacle permits the latch 202 to spring back up into a mechanically locked position within the receptacle once the insertion portion 201 of the connector 200 is fully inserted into the receptacle. The latch 202 is disengaged from the receptacle by pressing downward on the latch 202, allowing the latch 202 to once again move freely out of the receptacle.

In this description, "front side" with respect to a connector means the electrical interface side of the connector closer to the insertion portion, while "rear side" means the side of the connector closer to the cable. "Top side" means the side of the connector that includes the latch, whereas "bottom side" means the side of the connector opposite the latch. This terminology will be consistent throughout this description when referring to a connector or a view of a connector, even if other components (such as a host receptacle and/or adaptors) appear in the view. The same terminology will also be used with respect to other electrical devices that may plug into the receptacle.

Figure 3:
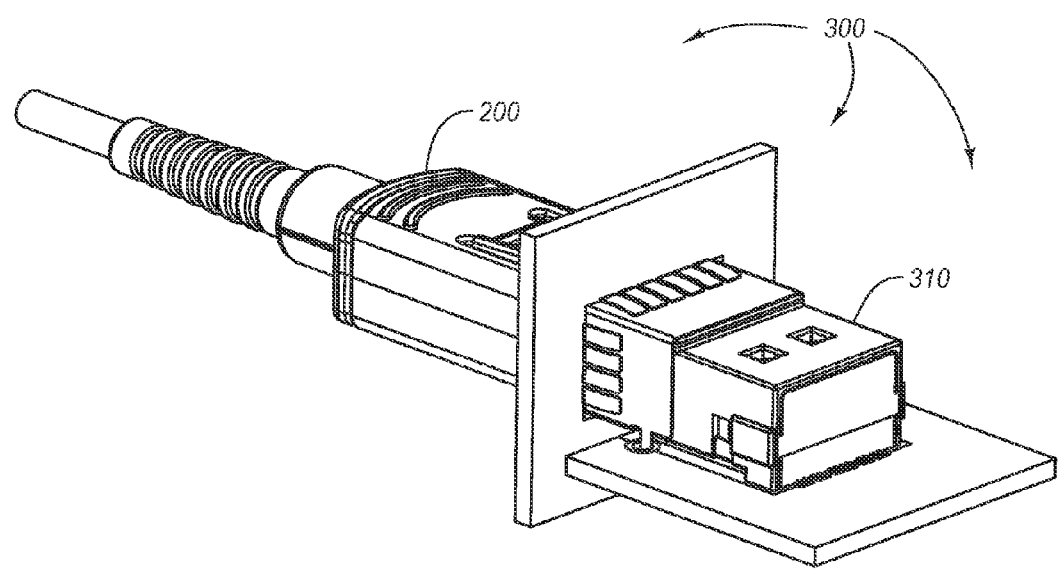
FIG. 3 illustrates a top front perspective view of the electrical connector plugged into a receptacle.
Figure 4:
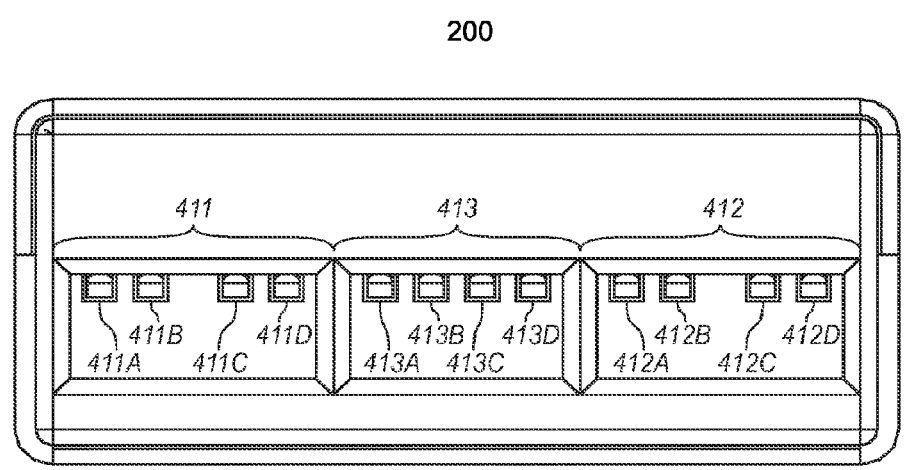
FIG. 4 illustrates a partial front view of the electrical connector of FIGS. 2A through 2C.

FIG. 3 illustrate a respective top front perspective view 300 of a combination 300 of the connector 200 as plugged into a corresponding receptacle 310. FIG. 4 shows a front view the electrical connector 200 showing 12 contacts segmented into three groups 411, 412, 413. For instance, the electrical contacts includes contact group 411 including four contacts total (contacts 411A, 411B, 411C and 411D), contact group 412 including four contacts total (contacts 412A, 412B, 412C and 412D), and contact group 413 including four contacts total (contacts 413A, 413B, 413C and 413D).

Each contact group 411 through 413 is separated from other groups by a particular distance. For instance, there is a larger gap between contacts 411D and 413A, and between contacts 413D and 412A. Although the principles of the present invention are not limited to the grouping of such electrical contacts, this grouping can result in reduced EMI emissions of the connector.

In one embodiment, the contact group 411 may be used for communicating differential electrical transmit signals (sometimes referred to in the art as TX+ and TX− signals) and also include two ground signals for improved signal quality. For instance, contacts 411A and 411D may be ground contacts, whereas contacts 411B and 411C may be TX+ and TX− contacts actually carrying the differential electrical transmit signal during operation. By controlling the distance between the differential transmit contacts 411B and 411C, and between each differential transmit contact and the neighboring ground contact 411A or 411D, the common mode impedance and differential mode impedance of the electrical transmit signal may be more closely controlled.

The contact group 412 may be used for communicating differential electrical receive signals (sometimes referred to as RX+ and RX− signals) and also include two ground signals for improved signal quality. For instance, contacts 412A and 412D may be ground contacts, whereas contacts 412B and 412C may be RX+ and RX− contacts actually carrying the differential electrical receive signal during operation. Once again, by controlling the distance between the differential receive contacts 412B and 412C, and between each differential receive contact and the neighboring ground contact 412A or 412D, the common mode impedance and differential mode impedance of the electrical receive signal may also more closely controlled. Such common mode and differential mode impedance control serves to reduce signal degradation contributed by the contacts, which is especially important at high data rates.

The contact group 413 may have contacts that serve purposes other than actually carrying the high speed electrical signal. For instance, the contacts 413 include contacts 413A through 413D may be used for power and lower speed signaling. For instance, one contact may be used to provide power to the connector, another might be used for presence detection, another might be used as a one-wire communication interface and yet another might be reserved or perhaps used as a power connection for the remote end of the cable.

That said, the specific contact configuration is only an example, and should not be read as limiting the broader scope of the principles of the present invention. Accordingly, an active cable is described in which an electrical connection is provided on at least one side of the cable to receive the high speed electrical signal, while having the signal being communicated optically through most of the cable length.

Having described an integrated cable that communicates over much of its length using optics with respect to FIGS. 1 through 4, the principles of the present invention will now be described in further detail with respect to FIGS. 5A through 11.

Figure 5A:
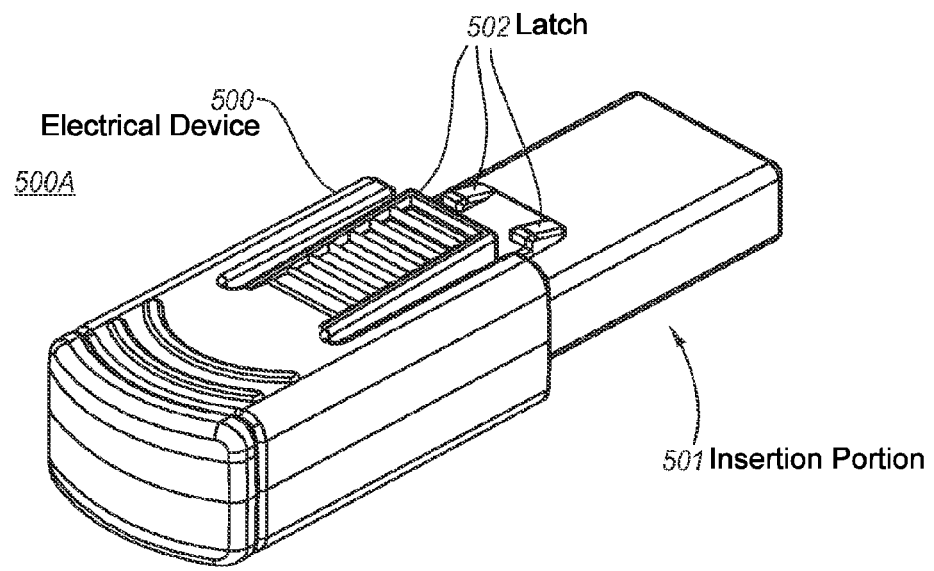
FIG. 5A illustrates a top rear perspective view of an electrical device that has a mechanical and electrical interface that is similar to that of the connector of FIGS. 2A through 2C.
Figure 5B:
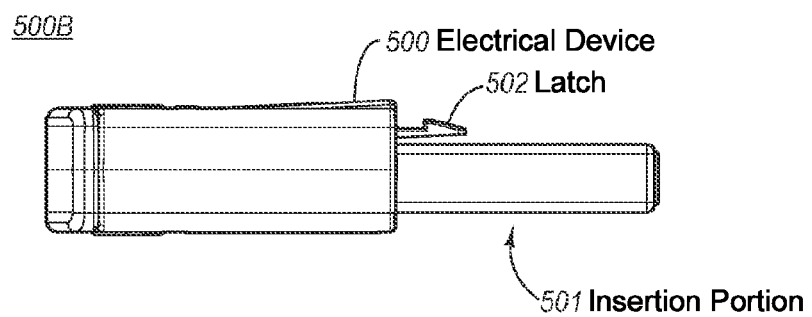
FIG. 5B illustrates a side view of the electrical device of FIG. 5A.
Figure 5C:
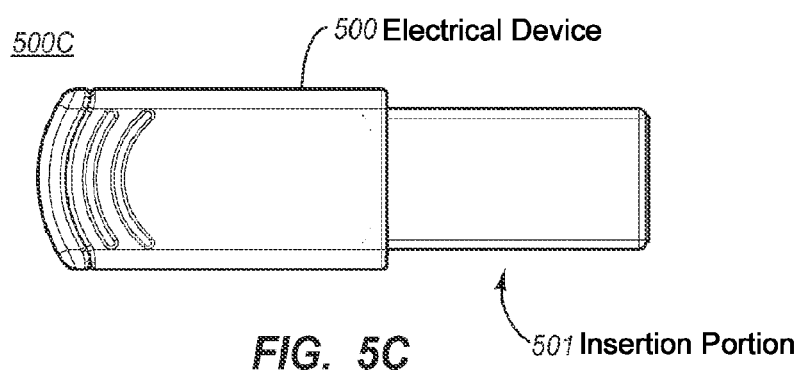
FIG. 5C illustrates a bottom view of the electrical device of FIG. 5A.

FIGS. 5A, 5B and 5C illustrate a respective top rear perspective view 500A, side view 500B, and bottom view 500C of an electrical device 500. The electrical device 500 has a similar mechanical and electrical interface for use in plugging into the receptacle 310. However, the electrical device 500 in not used for communication over an optical fiber, but is used for communication with a data endpoint within the electrical device. Note that the electrical device 500 is not in communication with an external cable.

Once again, the electrical device 500 includes an insertion portion 501 that may be inserted into the receptacle, whereupon a latch 502 may mechanically engage with the receptacle to lock the electrical device 500 into place within the receptacle until the next time the latch 502 is disengaged.

Figure 6:
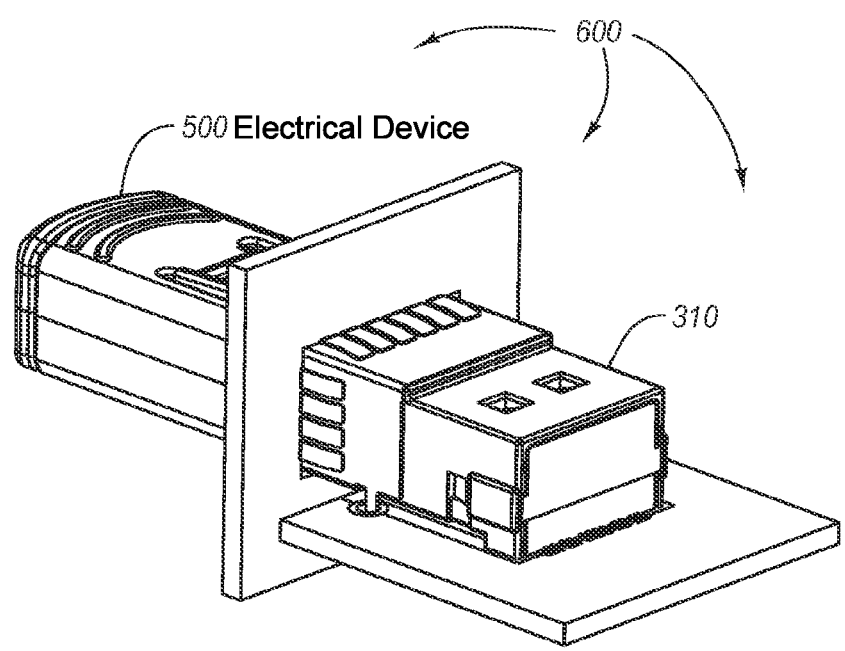
FIG. 6 illustrates a top front perspective view of the electrical device plugged into the receptacle.

FIG. 6 illustrate a respective top front perspective view of a combination 600 of the electrical device 500 plugged into a corresponding receptacle 310. The receptacle represents an example of the electrical port 112 or 122 of FIG. 1. FIGS. 7A through 10 will show an example construction of the receptacle 310 so that various internal features of the receptacle may be illustrated. The order of introduction illustrated in FIG. 7A through 10 does not imply an order of fabrication of the components of the receptacle 310.

Figure 7A:
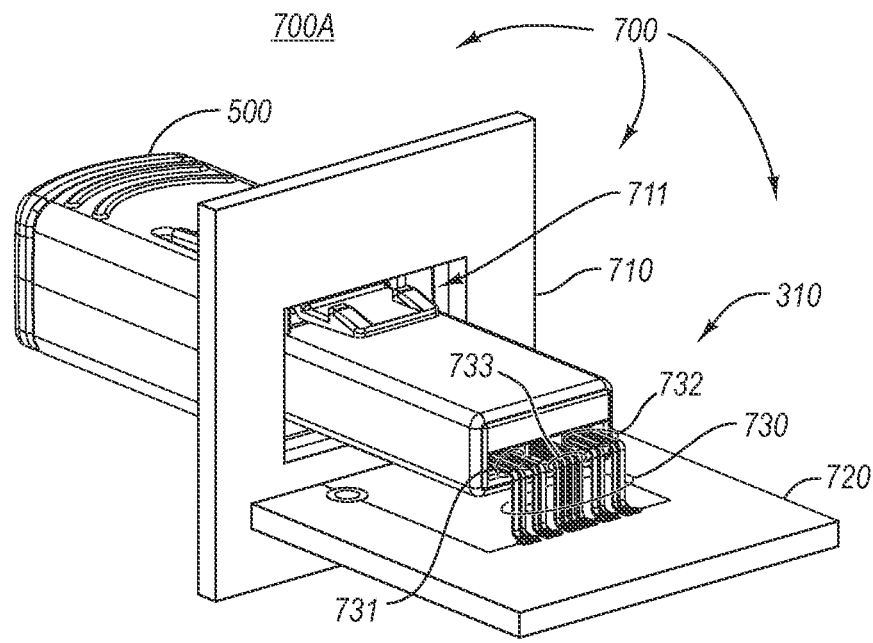
FIG. 7A illustrates a top front perspective view of the electrical device plugged into the receptacle, but with only the host panel, receptacle board, and contact array of the receptacle shown.
Figure 7B:
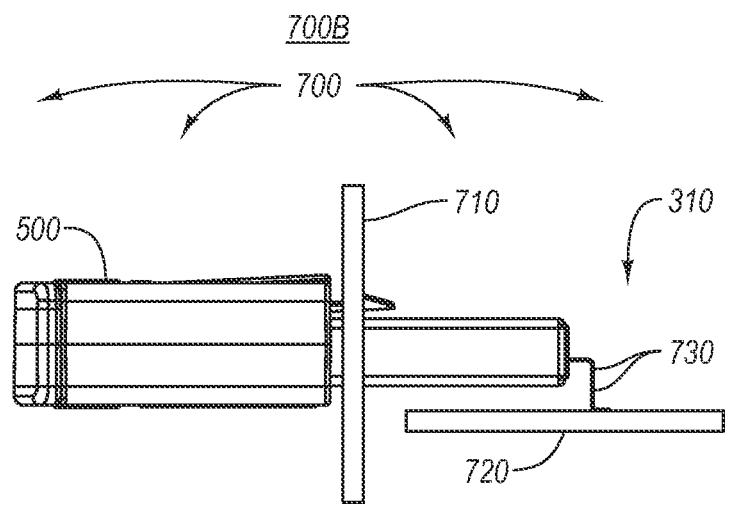
FIG. 7B illustrates a side view of the combination of FIG. 7A.
Figure 7C:
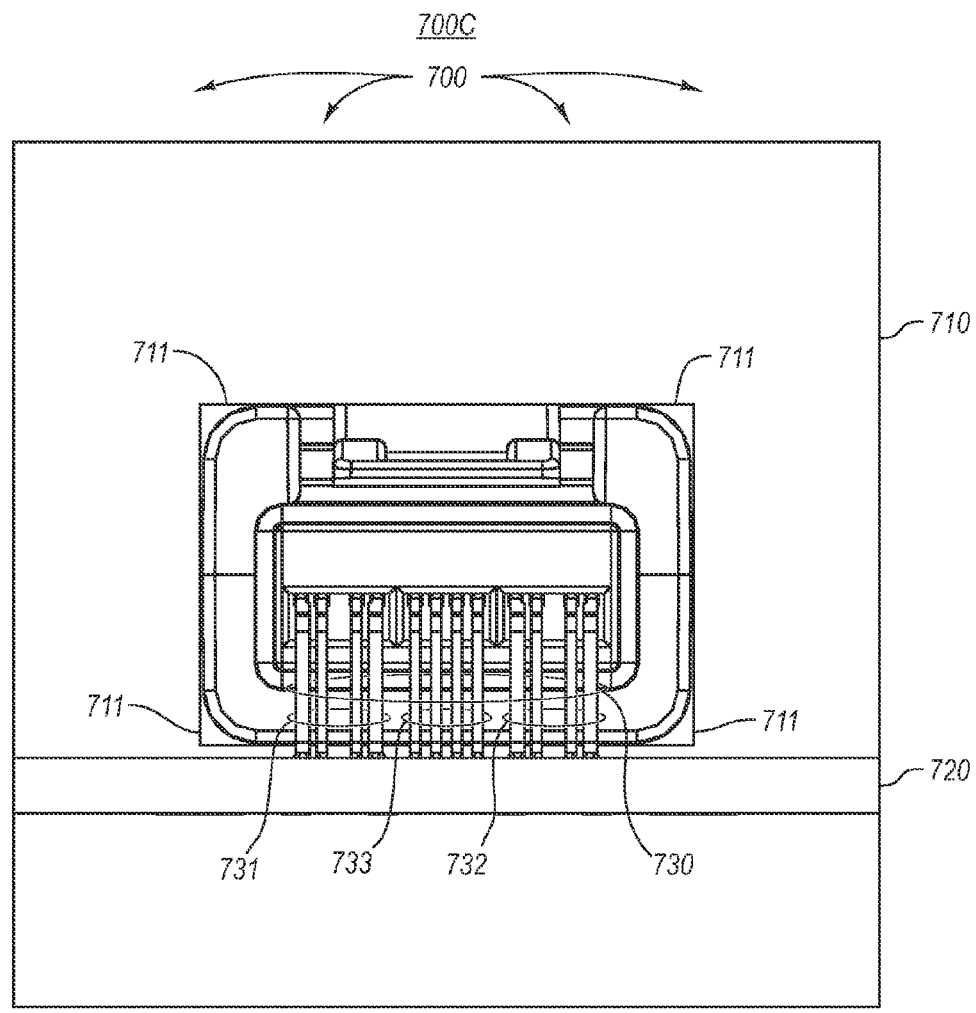
FIG. 7C illustrates a front view of the combination of FIG. 7A.

FIGS. 7A, 7B and 7C illustrate a respective top front perspective view 700A, a side view 700B, and front view 700C of the combination 700 of the electrical device 500 interfacing with components of the receptacle 310. Specifically, only three of the receptacle components are illustrated; namely, a host panel 710, a receptacle board 720, and a contact array 730 of receptacle side electrical contacts.

The host panel 710 may represent only a portion of a physical panel of the host into which the device 500 is plugged in. The receptacle board 720 may be, for example, a printed circuit board, that may include electrical traces (not shown) for routing electrical signals and power to and from the contact array 730.

Only a few components of the receptacle are shown in FIGS. 7A through 7C. The receptacle 310 would also include a mechanism for supporting the electrical device 500 as the device is plugged into the receptacle, a locking mechanism for interfacing with the latch 502 of the device 500, a mechanism for structurally supporting the contact array 730, and other components as will be apparent from the subsequent description of FIGS. 8A through 10.

As the device 500 is plugged into the receptacle 310, the device 500 passes through the hole 711 in the host panel 710, and is guided by structural pieces (not shown in FIGS. 7A through 7C) in the receptacle. In addition, the latch mechanism 502 locks into place when the device is fully connected. Furthermore, the contact array 730 of the receptacle 310 is electrically coupled with the corresponding contact array 401 (see FIG. 4). Specifically, one group of four receptacle-side contacts 731 contacts the group of four connector-side contacts (e.g., including the differential transmit contacts and two ground contacts. Another group of four receptacle-side contacts 732 contacts another group of four connector-side contacts (e.g., including the differential receive contacts and two ground contacts. The final group of four receptacle-side contacts 733 contacts the final group of four connector-side contacts (e.g., including the power, low-speed, and reserved contacts).

Figure 8A:
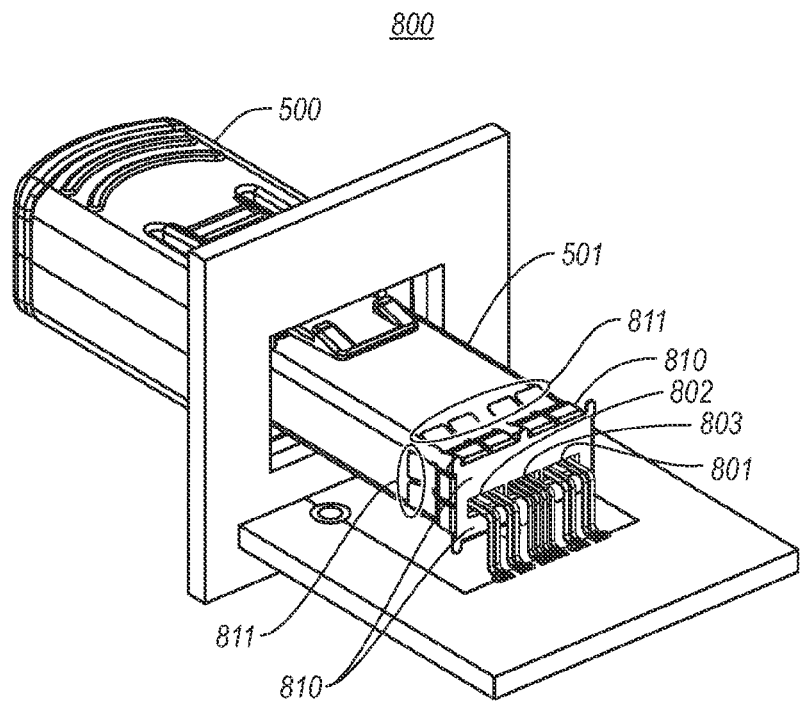
FIG. 8A illustrates a top front perspective view of the combination of FIG. 7A, but with a socket shield added.

FIG. 8A illustrates a top front perspective view of a combination 800 of the electrical device 500 plugged into the receptacle. The receptacle shows the same components as were illustrated in FIGS. 7A through 7C, but further includes a socket shield 810. The socket shield 810 serves as a component of the EMI barrier between the host and the ambient environment. In addition, the socket shield 810 completed the EMI shield of the electrical device, thereby serving as an EMI barrier between the connector, and the host environment as well. The socket shield 810 may be composed of conductive material, such as metal, and includes several fingers 811 that make electrical contact with the sleeve 501 of the electrical device 500, when the device 500 is plugged into the receptacle. The small openings at the front of the socket shield (where each of the three groups of contacts pass) are the largest openings in the connector and host EMI barrier and serve to limit EMI better that a single large opening would. The smaller openings are facilitated by the breaking up of the electrical contacts into three spatially distinct groupings as described above.

The receptacle-side contact set 731 contacts the corresponding device-side through the hole 801 in the socket shield 810. The receptacle-side contact set 732 contacts the corresponding device-side contact set 302 to form a second set of electrical connections through the hold 802 in the socket shield 810. Also, the receptacle-side contact set 733 contacts the corresponding device-side contact set to form a third set of electrical connections through the hole 803 in the socket shield 810. The socket shield covers the device housing which had represented the largest EMI discontinuity in the EMI barrier of the connector prior to the connector being plugged in. With the connector plugged in, the socket shield 810 covers the device housing. Thus, the EMI discontinuity at the front of the device is made into three much smaller EMI discontinuities. Although the EMI discontinuities at holes 801 through 803 are still perhaps the largest EMI discontinuities in the EMI barrier at the connector, the EMI protection afforded the connector may be significantly improved by the presence of the receptacle-side socket shield 810.

Figure 8B:
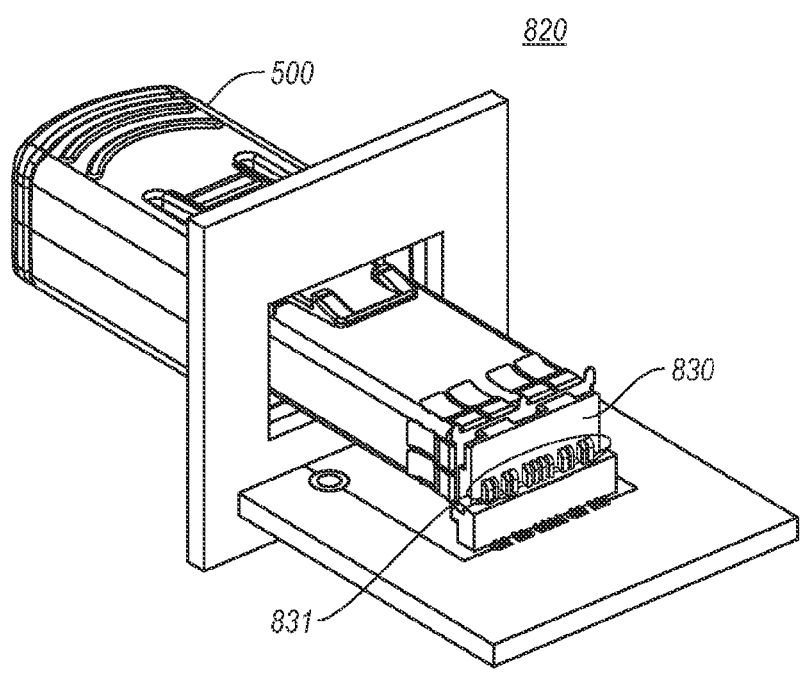
FIG. 8B illustrates a top front perspective view of the combination of FIG. 8A, but with the contact body shown.

FIG. 8B illustrates a top front perspective view of a combination 820 that is the same as the combination 800 of FIG. 8A, except that a contact body 830 is shown. The contact body 830 may be insert molded around the receptacle contacts. However, a portion of the contacts 831 is left exposed to facilitate effective insert molding.

Figure 8C:
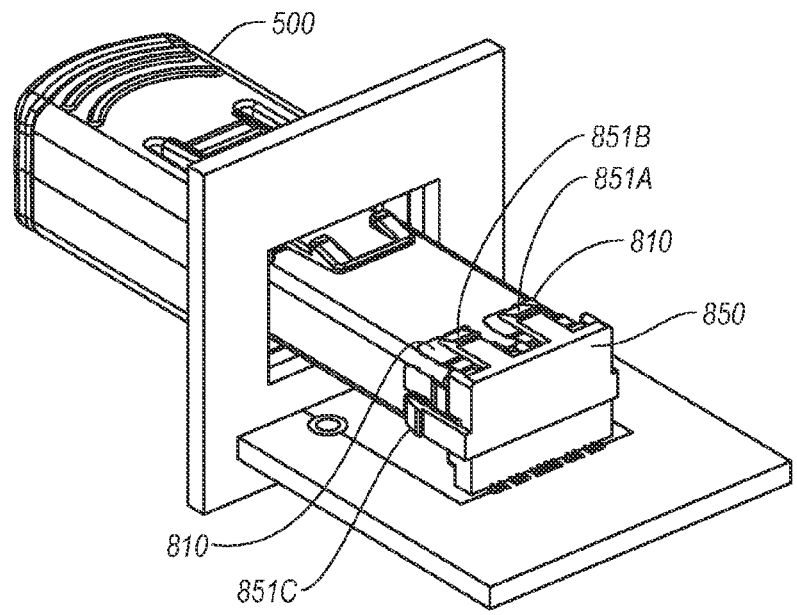
FIG. 8C illustrates a top front perspective view of the combination of FIG. 8B, but with the contact cover added.

FIG. 8C illustrates a top front perspective view of a combination 840 that is the same as the combination 820 of FIG. 8B, except that a contact cover 850 is shown. The contact cover 850 covers the previously exposed portion 831 of the contacts, and also extends over the end of the socket shield 810. The contact cover 850 also includes several prongs 851A, 851B, 851C, and so forth (two on the top, and one on each side).

Figure 9:
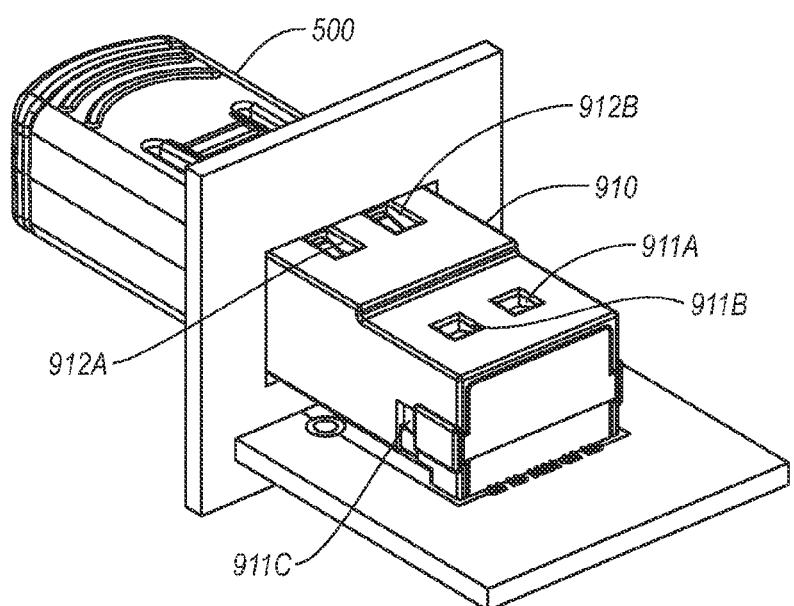
FIG. 9 illustrates a top front perspective view of the combination of FIG. 8C, but with a receptacle housing shown.

FIG. 9 illustrates a top front perspective view of a combination 900 that is the same as the combination 840 of FIG. 8C, except that receptacle housing 910 is disposed around the receptacle as shown. The receptacle housing 910 provides further EMI protection. The receptacle housing 910 also provides mechanical guidance for the device 500 as it is received into the receptacle. The socket housing includes holes 911A, 911B, 911C, and so forth, that receive respective prongs 851A, 851B, 851C, and so forth, of the contact cover 850. This mechanically locks the socket housing 910 to the contact cover 850. The socket housing 910 also includes two locking indentures 912A and 912B to receive the locking prongs of the locking mechanism 502 of the electrical device 500. This serves to latch the electrical device 500 in place when plugged into the receptacle.

Figure 10:
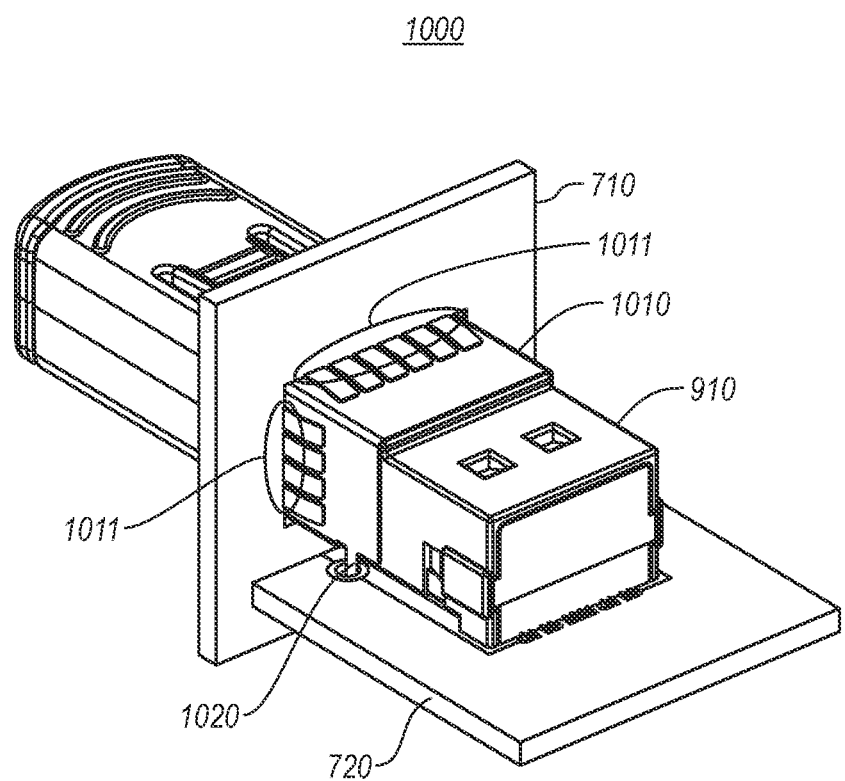
FIG. 10 illustrates a top front perspective view of the combination of FIG. 9, but with a host shield shown.

FIG. 10 illustrates a top front view of a combination 1000 that is the same as the combination 900 of FIG. 9, except that a host shield 1010 is disposed thereon. The host shield 1010 includes fingers 1011 that are bent back and placed in electrical contact with the host panel 710. The host shield 1010 is fixed at some voltage through a voltage pin 1020 in the host board 720. For example, the host shield 1010 may be grounded. This shield serves to prevent any other emissions generated inside the host chassis from escaping through the panel opening. The details of the fingers are such that the openings are of small enough dimensions to greatly attenuate any emission.

The receptacle housing 910 makes electrical contact with the host shield 1010 and the socket shield 810. The receptacle housing 910, in combination with the host shield 1010 and the socket shield 810 provide an effective EMI barrier between the host and the environment, regardless of whether or not the electrical device 500 is plugged in. In addition, the socket shield 810 serves to complete the EMI containment of the plug when it is inserted.

Figure 11:
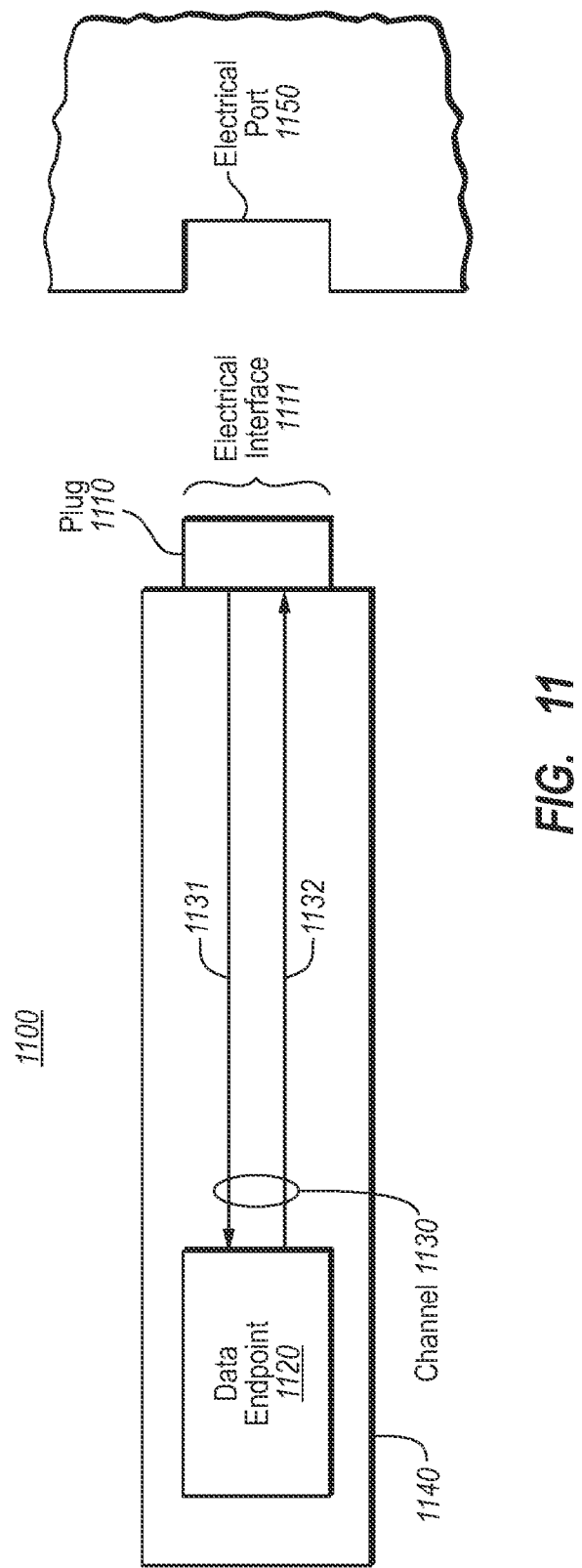
FIG. 11 illustrates an electrical device with an electrical interface that is compatible with optical cables in accordance with one aspect of the principles of the present invention.

FIG. 11 schematically illustrates a device 1100 that comprises a plug 1110. The device 1100 is illustrated symbolically to illustrated functional relations and interactions between the various components of the device. The electrical device 500 is an example of the device 1100. However, the device 1100 is shown more generally to show that the principles of the present invention are not limited to any specific form of an electrical device. In this description and in the claims, a "plug" is any connector that is configured to mechanically interface with a port external to the device. For instance, the plug 1110 is illustrated as symbolically mechanically interfacing with external port 1150.

The plug 1110 has an electrical interface 1111 configured to electrically communicate with the external port 1150 when the plug 1110 is mechanically interfacing with the external port. The device 1100 has a data communication endpoint 1120 which contains data. The device 1100 might be, for example, a memory device. In that case, the communication endpoint 1120 may contain non-volatile or volatile memory. For instance, the device 1100 might be, for example, a memory stick, a digital music player, a video player, a photograph player or storage device, an external hard driver, an external optical drive, a camera, or any other device that contains volatile or non-volatile memory or storage.

The device 1100 has a full electrical communication channel 1130 that "communicatively couples" the data communication endpoint 1120 with electrical interface of the plug 1110. In this description and in the claims, two nodes (such as data communication endpoint 1120 and plug 1110) are "communicatively coupled" if they are able to communicate data unidirectionally or bi-directionally between the two nodes. For instance, communication channel 1130 is illustrated as including electrical channel 1131 that communicates data from the plug 1110 to the data communication endpoint 1120, and electrical channel 1132 that communicates data from the data communication endpoint 1120 to the plug 1110. In a read-only device, only electrical channel 1132 will be used. In that case, the electrical channel 1131 need not even exist. In a read-write device, both electrical channels 1131 and 1132 are be used. In that case, the device 1100 is configured such that data may be written to and read from the communication endpoint 1120 when the plug 1110 is mechanically and electrically interfacing with the external port 1150. An electrical channel is a communication mechanism that employ electrical signals which involve the transfer of electrons, as contrasted with optical signals which involve the transfer of photons.

The communication channel 1130 is "full" electrical in that all communications between the data communication endpoint 1120 and the plug 1110 occur electrically, and not optically. The external port 1150 is configured to mechanically and electrically interface with the device 1100 that has a full electrical communication channel. Nevertheless, the external port 1150 is also configured to mechanically and electrically interface with an integrated cable that include an optical communication mechanism for communicating over most of the length of the integrated cable. An example of such an integrated cable is described above with respect to FIG. 1. Accordingly, the external port 1150 is quite flexible in that it can electrically and mechanically interface with a wide variety of devices.

As previously mentioned, the device 1100 of FIG. 11 represents symbolic components only. The principles of the present invention are not limited to a particular mechanical structure of such a device. In one embodiment, however, the device 1100 has a rigid casing 1140 that encases the data communication endpoint 1120 of the device 1110, thereby providing some mechanical protection and electrical isolation from the surrounding environment, while permitting appropriate mechanical and electrical coupling to the external port 1150 via the plug 1110.

In one embodiment, the device 1100 is "consumer grade". In this description and in the claims, a "consumer grade" device is one that has a rigid casing (such as rigid casing 1140). For instance, conventional memory sticks are consumer grade since they contain a rigid casing that protects against damage from impact or externally applied pressure.

Furthermore, a "consumer grade" device is a device in that has a mechanical locking mechanism such that less force is required to engage the plug 1110 with the external port 1150 than is required to remove the plug 1110 from the external port 1150. This allows for convenience engagement of the device with the external port, while preventing inadvertent disengagement.

Referring back to FIG. 11, the data communication endpoint 1120 may include a wireless communication device. For instance, the wireless communication device 1120 includes a transmitter for wirelessly transmitting data received by the data communication endpoint 1120 from the plug 1110. Alternatively or in addition, the wireless communication device 1120 includes a receiver for wireless receiving data to be communicated to the electrical interface of the plug.

Accordingly, the device 1100 is capable of mechanically and electrically interfacing with an external port 1150 that is also capable of electrically interfacing with an integrated cable that communicates of much of its length optically.

Accordingly, an embodiment has been described in which an electrical device may be plugged into a receptacle using a mechanical and electrical interface that might otherwise be used by an active cable. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device comprising:
   a plug configured to interface with an active cable receptacle that is separate from the device, the plug including a mechanical interface and an electrical interface, the mechanical interface configured to be releasably received within the active cable receptacle, the mechanical interface being substantially similar to a mechanical interface of an active cable that is also configured to be releasably received within the active cable receptacle, the active cable configured to convert a received electrical signal to an optical signal and communicate the optical signal over most of the length of the active cable, the electrical interface including at least five electrical contacts each being configured to mechanically and electrically interface with at least one of twelve electrical contacts of the active cable receptacle, the twelve electrical contacts of the active cable receptacle being divided into a first group of four electrical contacts, a second group of four electrical contacts, and a third group of four electrical contacts, the first group being configured for transmitting signals and the second group being configured for receiving signals;
   a data communication endpoint; and
   an internal electrical communication channel communicatively coupling the data communication endpoint with the electrical interface of the plug, the electrical communication channel configured to communicate data between the data communication endpoint and the electrical interface exclusively via electrical communication.

2. The device according to claim 1, wherein the device is a memory device, wherein the data communication endpoint comprises memory.

3. The device according to claim 2, wherein the device is configured such that data may be written to and read from the memory at least when the plug is mechanically and electrically interfacing with the active cable receptacle.

4. The device according to claim 2, wherein the device is a memory stick.

5. The device according to claim 2, wherein the device is a music player.

6. The device according to claim 2, wherein the device is a video player.

7. The device according to claim 2, wherein the device is an external hard drive.

8. The device according to claim 2, wherein the device is an external optical disk drive.

9. The device according to claim 1, wherein the data communication endpoint comprises a transmitter for wirelessly transmitting data received by the data communication endpoint from the electrical interface of the plug.

10. The device according to claim 1, wherein the data communication endpoint comprises a receiver for wirelessly receiving data to be communicated to the electrical interface of the plug.

11. The device according to claim 1, further comprising a rigid casing that encases the data communication endpoint and at least a portion of the electrical communication channel and the plug, the rigid casing not configured to interface with an external cable and the data communication endpoint not configured to communicate with an external cable.

12. The device according to claim 1, wherein the mechanical interface of the plug includes a latching mechanism for latching with the active cable receptacle when the mechanical interface of the plug is mechanically interfacing with the active cable receptacle.

13. The device according to claim 12, wherein the latching mechanism is configured to mechanically engage with the active cable receptacle to lock the device into place within the active cable receptacle until the next time the latching mechanism is disengaged, and the latching mechanism requires less force to engage the plug with the active cable receptacle than is required to disengage the plug from the active cable receptacle.

14. The device according to claim 13, wherein the latching mechanism includes two locking prongs configured to be received by and mechanically engage with two locking indentures of the active cable receptacle.

15. The device according to claim 1, wherein the at least five electrical contacts of the electrical interface are configured to electrically and mechanically interface with the twelve electrical contacts of the active cable receptacle along a top side of the plug.

16. The device according to claim 1, wherein the electrical interface is configured to make electrical contact with a plurality fingers of the active cable receptacle that serve as EMI barriers between the active cable receptacle and an ambient environment.

17. A device comprising:
    a plug configured to interface with an active cable receptacle that is separate from the device, the plug including an electrical interface and a mechanical interface, the electrical interface including at least five electrical contacts each being configured to mechanically and electrically interface with at least one of twelve electrical contacts of the active cable receptacle, the twelve electrical contacts of the active cable receptacle being divided into a first group of four electrical contacts, a second group of four electrical contacts, and a third group of four electrical contacts, the first group being configured for transmitting signals and the second group being configured for receiving signals, the mechanical interface configured to be releasably received within the active cable receptacle, the mechanical interface being substantially similar to a mechanical interface of an active cable that is also configured to be releasably received within the active cable receptacle, the active cable configured to convert a received electrical signal to an optical signal and communicate the optical signal over most of the length of the active cable, the mechanical interface including a latching mechanism for latching with the active cable receptacle when the mechanical interface of the plug is releasably received within the active cable receptacle, the latching mechanism being configured to mechanically engage with the active cable receptacle to lock the mechanical interface into place within the active cable receptacle until the next time the latching mechanism is disengaged, the latching mechanism requiring less force to engage the mechanical interface with the active cable receptacle than is required to disengage the mechanical interface from the active cable receptacle;

a data communication endpoint not configured to communicate with an external cable;

an internal electrical communication channel communicatively coupling the data communication endpoint with the electrical interface of the plug, the electrical communication channel configured to communicate data between the data communication endpoint and the electrical interface exclusively via electrical communication; and a rigid casing that encases the data communication endpoint and at least a portion of the electrical communication channel and the plug, the rigid casing not configured to interface with an external cable.

18. The device according to claim 17, wherein the latching mechanism includes two locking prongs configured to be received by and mechanically engage with two locking indentures of the active cable receptacle.

19. A memory device comprising:
a plug configured to interface with an active cable receptacle that is separate from the device, the plug including an electrical interface and a mechanical interface, the electrical interface including at least five electrical contacts each being configured to mechanically and electrically interface with at least one of twelve electrical contacts of the active cable receptacle along a top side of the plug, the twelve electrical contacts of the active cable receptacle being divided into a first group of four electrical contacts, a second group of four electrical contacts, and a third group of four electrical contacts, the first group being configured for transmitting signals and the second group being configured for receiving signals, the electrical interface further configured to make electrical contact with a plurality fingers of the active cable receptacle that serve as electromagnetic interference (EMI) barriers between the active cable receptacle and an ambient environment, the mechanical interface configured to be releasably received within the active cable receptacle, the mechanical interface being substantially similar to a mechanical interface of an active cable that is also configured to be releasably received within the active cable receptacle, the active cable configured to convert a received electrical signal to an optical signal and communicate the optical signal over most of the length of the active cable;

a memory not configured to communicate with an external cable;

an internal electrical communication channel communicatively coupling the memory with the electrical interface of the plug, the electrical communication channel configured to communicate data between the memory and the electrical interface exclusively via electrical communication; and a rigid casing that encases the memory and at least a portion of the electrical communication channel and the plug, the rigid casing not configured to interface with an external cable.

20. The device according to claim 1, wherein:
the mechanical interface of the plug includes a latching mechanism for latching with the active cable receptacle when the mechanical interface of the plug is mechanically interfacing with the active cable receptacle, the latching mechanism including two locking prongs configured to be received by and mechanically engage with two locking indentures of the active cable receptacle to lock the device into place within the active cable receptacle until the next time the latching mechanism is disengaged, and the latching mechanism requiring less force to engage the plug with the active cable receptacle than is required to disengage the plug from the active cable receptacle;

the at least five electrical contacts of the electrical interface includes twelve electrical contacts where each is configured to electrically and mechanically interface with one of the twelve electrical contacts of the active cable receptacle along a top side of the plug;

the first group of four electrical contacts of the twelve electrical contacts of the active cable receptacle includes two electrical contacts configured to transmit a differential signal and two ground contacts;

the second group of four electrical contacts of the twelve electrical contacts of the active cable receptacle includes two electrical contacts configured to receive a differential signal and two ground contacts;

the third group of four electrical contacts of the twelve electrical contacts of the active cable receptacle includes at least one electrical contact configured to provide power; and the electrical interface is configured to make electrical contact with a plurality fingers of the active cable receptacle that serve as EMI barriers between the active cable receptacle and an ambient environment.

\* \* \* \* \*